Patented Aug. 25, 1953

2,650,166

UNITED STATES PATENT OFFICE 2,650,166

MILK PRODUCT ENHANCED IN AMINO ACIDS AND PEPTIDES

Frank H. Tinkler, Rexford C. Stribley, and John G. Kennedy, Mason, Mich., assignors, by mesne assignments, to American Home Products Corporation, New York, N. Y., a corporation of Delaware No Drawing. Application April 7, 1950, Serial No. 154,724

4 Claims. (Cl. 99—57)

---

This invention relates to a milk product enhanced in soluble, non-coagulable hydrolysis products of milk proteins (amino acids and peptides), to a lactose composition comprising such protein hydrolysis products and adapted to be used as an ingredient in such milk product, and to a method of preparing the lactose composition. In one embodiment of our invention the milk product and the lactose composition are selectively enhanced in tryptophane and sulfur-containing amino acids. Our method of preparing a lactose composition enhanced in the desired protein hydrolysis products, especially amino acids and peptides, comprises proteolytically digesting whey, demineralizing the digested whey by contact with ion-exchange materials, thereby simultaneously removing nitrogenous materials selectively from the whey, and recovering the desired lactose product from the whey.

Our milk product is a highly nutritious food, providing protein hydrolysis products in a readily assimilable form; as a liquid concentrate it can be heat-sterilized without substantial adverse effect. Our lactose composition, as will be seen from the following description, is particularly adapted to serve as an ingredient in such a milk product and can be economically produced. Our method of production permits demineralization with ion-exchange resins without precipitation on or clogging of the resin beds in either upflow or downflow.

In the search for improved replacements of mothers' milk, attention has been directed to the problem of the difference in composition of the proteins found in human and bovine milk.

Cows' milk on the average contains about 2.8 percent casein and 0.5 percent lactalbumin; the corresponding figures for human milk are 0.5 percent casein and 1 percent lactalbumin. Since cows' milk contains approximately twice as much total protein as human milk, it is ordinarily diluted to about ½ its original protein content for infant feeding. When so diluted, however, the composition of its protein content is quite different from that of human milk. Measured in terms of the amino-acid content of the respective proteins, the chief differences are a deficiency in cows' milk of tryptophane and cystine, and a somewhat greater content of methionine. All these are essential amino acids. Accordingly, when cows' milk is diluted ½ to approximately the protein content of human milk, the proteins in the diluted milk are deficient in tryptophane and cystine, as compared with human milk, but contain somewhat more methionine.

Cystine can be synthesized from methionine in the human body, but methionine cannot. However, the excess of methionine in cows' milk protein is insufficient to make good the deficiency of cystine in this way. Furthermore, there is some evidence to show that methionine in bovine casein is not as available for this purpose as previously thought—Williams and Elvehjem, J. Biol. Chem., 181, 559 (1949).

The following table gives the average content of methionine and cystine as reported by all investigators up to 1946 in terms of grams of the respective amino acids per 16 grams nitrogen— i. e. the respective amino acid content related to total protein content:

TABLE 1

*G. amino acid per 16 g. nitrogen*

|  | Cows' Milk Protein | Human Milk Protein |
|---|---|---|
| Methionine | 3.2 | 2.2 |
| Cystine | 0.9 | 2.6 |

—Block and Bolling. Arch. Biochem., 10, 359 (1946).

Both methionine and cystine being sulfur-containing amino acids and methionine being convertible in the system to cystine, their combined availability may be compared in terms of millimols of amino-acid sulfur. (Methionine: M. W. 149.15 with 1 sulfur atom; cystine: M. W. 240.23 with 2 sulfur atoms.) The data in Table 1 then convert to these terms:

TABLE 2

*Millimols amino-acid sulfur per 16 g. nitrogen*

|  | Cows' Milk Protein | Human Milk Protein |
|---|---|---|
| Methionine | 21.4 | 14.7 |
| Cystine | 7.4 | 21.4 |
| Total | 28.8 | 36.1 |

In human milk there is thus an excess of some 25 percent amino-acid sulfur as compared with cows' milk diluted to the same protein concentration.

While we realize that even in the same species the amino-acid content of milk proteins varies, we believe the above figures are fairly representative since they are derived from averages of numerous determinations.

It is one object of our invention to provide a milk product enhanced in nutritional hydrolysis products of milk proteins, especially amino acids and peptides.

It is a further object of our invention to provide a lactose composition containing such protein hydrolysis products and having a low-ash content, which is adapted to serve as a constituent of a reconstituted milk product.

It is an additional object of our invention to provide a milk product selectively enhanced in tryptophane and sulfur-containing amino-acids, and to provide a lactose composition suitable for use in preparing such a milk product.

It is a still further object of our invention to provide a simple and efficient process for making such products.

Other objects and advantages will be apparent to those skilled in the art from the following description.

Lactose is usually prepared from whey by a process involving deproteinizing the whey by heat and acid coagulation, removal of the coagulum and crystallization of lactose from the deproteinized liquor.

If the whey is submitted to a proteolytic enzymic digestion, the soluble proteins may be converted completely to a non-coagulable form consisting of amino acids and peptides. We have discovered that if the thus treated whey is then subjected to a demineralizing action by passing it successively over cation- and anion-exchange resins under controlled conditions, inorganic ions may be removed to an extent sufficient to provide an acceptable low-ash product, while substantial amounts of amino acids and peptides remain in solution, an effluent being produced containing dissolved lactose together with amino acids and peptides. The demineralization may be so carried out as to produce a lactose product selectively enhanced in tryptophane and amino-acid sulfur, the ash content being reduced to a value acceptable in a reconstituted milk product. Such an effluent may be dried directly, as by spraying-drying, vacuum drum-drying or the like, to produce a solid lactose product of low-ash content and containing the desired amino acids and peptides, or alternatively the effluent may be evaporated to yield a liquid concentrate. Thus not only is enhancement in nutritional amino acids and peptides secured, but simultaneously lactose losses inherent in a crystallization process are eliminated. Furthermore, nutritional nitrogen is largely present in the readily assimilable form of uncondensed amino acids and peptides. As pointed out above the amino-acid content may be selectively enhanced in tryptophane and sulfur-bearing amino acids.

According to our invention we clarify and defat whey to remove any residual casein flocs and fat globules that it may contain, and then submit it to a proteolytic fermentation. We prefer to use $H_2S$-activated papain as the ferment, but other proteolytic enzymes may be used such as pancreatic protease, protease from molds, pepsin, and commercial proteolytic enzymes such as "RHozyme" (Röhm and Haas, Philadelphia, Pa.). If papain is used, it may be activated by other agents than $H_2S$, such as HCN, ascorbic acid, etc., but $H_2S$ is our preferred activating agent.

When using papain, we adjust the acidity of the whey within the range pH 5.0–7.2, preferably to about pH 5.5, and carry out the fermentation at an elevated temperature not above 70° C. till complete; e. g. with papain activated by $H_2S$ for about 30 minutes at about 37° C., about 2.5 to 6 hours at 60°–65° C. are required. The fermented liquor is then heated to a higher temperature, preferably about 85° C., to inactivate the enzyme, cooled and filtered.

We then pass the filtrate successively over a cation-exchange resin and an anion-exchange resin. Various brands of such resin are available commercially and we do not limit our invention to particular brands, but we have had good results using "Amberlite IR–105" (Röhm and Haas, Philadelphia, Pa.) or "Nalcite MX" (Dow Chemical Co., Midland, Mich.) as the cation exchanger and "Duolite A–3" (Chemical Process Co., San Francisco, Calif.) as the anion exchanger.

We prefer to carry out the demineralization in steps. This may be done either in a main-and-scavenger system or in a countercurrent system.

In the former case the filtrate, containing lactose, amino acids, peptides and inorganic salts, is first passed through a main unit, comprising beds of cation- and anion-exchange material, where the major part of the demineralization is effected and then through a similar smaller scavenger unit where the solution is finally demineralized to the desired extent. In each unit the relative sizes of the cation- and anion-exchange beds are preferably chosen so that both beds become exhausted at nearly the same time when run in series, i. e. when a given volume of liquid is passed in turn through the cation- and anion-exchange bed. The relative sizes of the main-and-scavenger units are also preferably chosen so that both units are exhausted to the desired level by the same volume of liquid passed successively through the main-and-scavenger units.

In practical operation conditions are so chosen as to effect demineralization to the desired extent, i. e. to not over 1% ash and preferably lower, while permitting passage of substantial amounts of the desired amino acids and peptides, especially tryptophane and the sulfur-bearing amino acids, cystine and methionine. This is achieved if the pH values of the effluents are controlled according to the following table:

TABLE 3

*Main-and-scavenger method*

|  | pH final effluent range | Preferred | pH combined effluent range | Preferred |
|---|---|---|---|---|
| Main cation | 3.5–4.3 | 4.0 | 1.7–2.0 | 1.9 |
| Main anion | 3.5–4.3 | 3.8 | 5.5–6.5 | 5.9 |
| Scavenger cation | 4.1–4.3 | 4.2 | 3.8–4.2 | 4.0 |
| Scavenger anion | 4.2–5.4 | 4.7 | 5.5–7.0 | 6.0 |

In countercurrent demineralization three units of identical size are employed; two being continuously on-stream while the idle unit is being regenerated. The filtered liquor from the digestion is passed first through a partially exhausted unit and then through a fresh or nearly fresh unit. The units are kept on-stream until breakthrough occurs in the first unit; it is then taken off-stream for regeneration, the second unit takes the place of the former first unit and the freshly regenerated unit is shunted in in place of the former second unit.

Specific embodiments of our invention are described in the following examples, but these are to be taken as illustrative only and not as limiting our invention, the scope of which is defined in the appended claims.

EXAMPLE 1

One hundred and seventy-four liters cheese whey, pH 5.5, was digested for 1½ hours at 66° C. with 54 g. H₂S-activated papain; more papain was added and the digestion continued for an additional 2½ hours. The digest was then heated to 93° C. and filtered hot with the addition of a filter aid ("Celite #505," Johns-Manville Corp., N. Y.). The filtrate was clear and contained no material that was heat-coagulable or precipitated by trichloroacetic acid.

A portion of the digest was then passed downflow through main-and-scavenger deionizing units, in each unit being passed first through the cation bed and then through the anion bed.

"Nalcite MX" was used as the cation-exchanger and "Duolite A-3" as the anion exchanger.

Condensed data for the deionizing steps follow:

TABLE 4

Main unit:
| | |
|---|---|
| Cation bed volume ml | 8800 |
| Influent pH | 5.58 |
| Effluent collected l | 63 |
| Effluent pH, last portion | 4.17 |
| Effluent pH, total effluent | 1.94 |
| Anion bed volume ml | 3500 |
| Influent pH | 1.94 |
| Effluent collected l | 56 |
| Effluent pH, last portion | 3.82 |
| Effluent pH, total | 5.95 |
| Effluent ash, solids basis percent | 1.73 |

Scavenger unit:
| | |
|---|---|
| Cation bed volume ml | 1500 |
| Influent pH | 5.95 |
| Effluent collected l | 40 |
| Effluent pH, last portion | 4.27 |
| Effluent pH, total | 4.18 |
| Anion bed volume ml | 750 |
| Influent pH | 4.18 |
| Effluent collected l | 39 |
| Effluent pH, last portion | 4.40 |
| Effluent pH, total | 5.57 |

The solution remainded clear throughout the downflow demineralization and there was no precipitation on the resins. The volumes listed do not include sweetening-off water.

The finished solution was concentrated under vacuum to 25-30% solids content, filtered warm without filter aid and spray-dried. The yield was 1271 g. of a low-density nearly white, hygroscopic powder, having the following analysis:

TABLE 5

| | |
|---|---|
| Moisture percent | 1.53 |
| Total nitrogen do | 1.80 |
| Protein equivalent (N x 6.25) do | 11.2 |
| Amino nitrogen do | 0.35 |
| Ash do | 0.63 |
| Tryptophane mg./g | 1.38 |
| Total Sulfur (method of Rosenheim & Drummond) mg./g | 0.67 |
| Lactose monohydrate (by Munson-Walker) percent | 89.64 |

The product was completely soluble in water to yield a clear solution.

EXAMPLE 2

Cheddar cheese whey was adjusted to pH 5.5 and digested with H₂H-activated papain in an amount equal to 3% of the protein equivalent of the whey nitrogen; the digestion was carried out at about 66° C. until the digest gave no precipitate with trichloroacetic acid, requiring ordinarily 2½ hours or somewhat longer. After inactivation at about 90°-93° C., the digest was filtered with a filter aid to yield a sparkingly clear greenish yellow solution.

This filtrate was double-demineralized by passing successively through two ion-exchange units, the first being partly-to-nearly-exhausted, and the second being fresh-to-partly-exhausted. When the first unit showed indications of breakthrough, it was taken off-stream for regeneration and a freshly regenerated unit shunted on-stream. The latter then became the second unit and the former second unit became the first unit, in the direction of solution travel.

Each unit comprised a cation bed of 9175 ml. volume, 110 cm. deep, containing "Amberlite IR-105" and an anion bed of 5300 ml. volume, 115 cm. deep, containing "Duolite A-3." In each unit the solution passed through the cation bed and then through the anion bed. The cycle of operations for each unit comprised: rinse, backwash, regeneration, sweetening-on, demineralization to partial exhaustion in number 2 position, demineralization to practical exhaustion (e. g. utilization of 85-98% capacity) in number 1 position, and sweetening-off. All effluents containing 1% or more lactose were worked up; those containing less than 1% were discarded.

The demineralizing units were operated with digested whey through a number of cycles to bring the resins to equilibrium, after which effluent was collected for working up. The ash content of the digested whey ranged from 0.50 to 0.65 mg./ml. (8.4-10% on dry basis), the average ash throughout was 279 g. per cycle and the average pH of the effluent was 6.9, the range being from 6.6 to 7.4.

The collected effluents were concentrated in a vacuum pan, roll-dried and pulverized. The product was a nearly white non-hygroscopic powder having the following analysis:

TABLE 6

| | |
|---|---|
| Lactose, anhydrous (by Munson-Walker) per cent | 90.5 |
| Total nitrogen do | 1.32 |
| Protein equivalent (N×6.25) do | 8.27 |
| Amino nitrogen do | 0.2 |
| Ash do | 0.40 |
| Moisture do | 1.15 |
| Tryptophane mg./g | 0.62 |
| Sulfur do | 0.35 |

EXAMPLE 3

The amino-acid-containing lactose product of our invention may advantageously be combined with other products to form a reconstituted milk product suitable for infant feeding, as a dietary adjunct for invalids and the ageing, and for similar uses. Such a product may advantageously contain skim cows' milk, fat, vitamins, minerals and our lactose composition containing soluble non-coagulable hydrolysis products of milk proteins such as amino acids and peptides. The lactose content may also be supplied in part by the addition of ordinary crystalline edible lactose. Use of a mixture of lactose and our lactose-amino-acid peptide composition facilitates standardization and permits fixing the specification for total nitrogen at a figure lower than could be supplied by our composition.

A practicable range of composition for such a milk-base product is (by weight, dry basis): 25–35% skim milk solids, 25–35% emulsified edible fats, 0–25% edible lactose, and 20–45% of our lactose-amino-acid-peptide composition.

An example of such a product is the following:

TABLE 7

|  | Wet Basis | Approximate Dry Basis |
|---|---|---|
|  | Percent | Percent |
| Skim cows' milk (9% solids) | 80.6 | 27.3 |
| Amino-acid-and-peptide-containing lactose product | 11.1 | 41.8 |
| Sodium caseinate | 0.7 | 2.6 |
| Fat { oleo stock ___ 27.5 parts, oleo oil ___ 27.5 parts, coconut oil ___ 17.5 parts, soybean oil ___ 16.5 parts, corn oil ___ 10.0 parts, lecithin ___ 1.0 part } | 7.5 | 28.2 |
| Total | 99.9 | 99.9 |

Balance—minerals and vitamins.

The ingredients are blended and pasteurized in ways well known in the food industry. The resulting blend is concentrated and may be distributed either as a concentrated sterilized liquid of 23–28% solids or as a powder containing preferably not over 2% moisture; with either form the addition of a suitable amount of water converts the concentrate to a liquid milk-base food suitable for use as such.

EXAMPLE 4

The nutritive value of our food is indicated by rat-feeding experiments.

Each of three groups of 10 weanling rats of both sexes was fed one of the diets A, B and C ad libitum for 28 days; vitamin supplements were administered equally to all groups daily. Diet A was highly inadequate as to protein; diets B and C had a suboptimal and approximately equal protein content as estimated by nitrogen determination. Make-up of the diets is shown in the following table:

TABLE 8

|  | Diet A | Diet B | Diet C |
|---|---|---|---|
|  | Percent | Percent | Percent |
| Crystalline lactose | 57.0 |  | 51.84 |
| Amino-acid-peptide-lactose product |  | 57.0 |  |
| Casein | 8.36 | 8.36 | 13.53 |
| Lactalbumin | 1.64 | 1.64 | 1.63 |
| U. S. P. XII salt mix #2 | 3.0 | 3.0 | 3.0 |
| Fat | 30.0 | 30.0 | 30.0 |
| Nitrogen | 1.32 | 2.14 | 2.08 |

The product of our invention used in diet B and designated above as "Amino-acid-lactose Product" had the following composition:

TABLE 9

*Amino-acid-lactose product*

| Moisture | per cent | 1.30 |
|---|---|---|
| Total nitrogen | do | 1.41 |
| Protein equivalent | do | 8.80 |
| Amino nitrogen | do | 0.3 |
| Ash | do | 0.70 |
| Tryptophane | mg./g. | 1.20 |
| Sulfur | do | 0.32 |
| Lactose (monohydrate) | per cent | 91.2 |

The relative growth of the three groups of rats in terms of gain in weight is shown in the following table:

TABLE 10

|  | Average Weight Gain per Rat of Groups Receiving— | | |
|---|---|---|---|
|  | Diet A | Diet B | Diet C |
|  | G. | G. | G. |
| Initial weight | 52 | 52 | 52 |
| Final weight | 51 | 81 | 69 |
| Gain | −1 | 29 | 17 |
| Food consumed | 77 | 99 | 89 |
| Gain per g. food consumed |  | 0.29 | 0.19 |
| Gain per g. nitrogen consumed |  | 13.7 | 9.2 |

Diet A, high in lactose and low in protein, failed to produce growth.

Diet B containing our product thus proved acceptable (largest amount consumed per rat) and more nutritious and efficient than diet C (growth per rat, growth per g. food consumed, growth per g. nitrogen consumed). These results show that nitrogen in the form of amino acids and peptides in our product has better growth promoting properties than the same amount of casein nitrogen.

From the above description it will be seen that we have invented a novel and nutritious amino-acid-and-peptide-containing lactose product, especially adapted to be used as a constituent in reconstituted milk-base food products, and that we have provided a simple and economical process for manufacturing it. As will be clear from our disclosure to those skilled in the art, numerous modifications may be made without departing from the spirit of our invention and the scope of our claims.

We claim:

1. A process of producing an edible lactose product containing not over 1 percent by weight of ash on a solids basis and enhanced in soluble non-coagulable hydrolysis products of milk protein which comprises digesting whey in the presence of a proteolytic enzyme until substantially the entire protein content of the whey is converted to a form non-precipitable by trichloroacetic acid, and demineralizing the digested whey by contact successively with a cation-exchange resin and an anion-exchange resin, the amount of resins used and the volume of solution treated being so chosen as to reduce the ash content of the solution to not over 1 percent by weight on a solids basis and provide an effluent having a pH between about 4.0 and about 7.0, whereby an effluent is produced the solids content of which consists for the most part of lactose containing less than 1 percent by weight of ash and enhanced in soluble non-coagulable hydrolysis products of milk protein.

2. In combination with the process as defined in claim 1, the further step of concentrating the effluent at a temperature below its normal boiling point to a solids content of at least 20 percent by weight, to produce a concentrated edible lactose product containing less than 1 percent by weight of ash on a solids basis and enhanced in nutritional amino acids.

3. In combination with the process as defined in claim 1, the further steps of concentrating and drying the effluent at non-deleterious temperatures to produce an edible solid lactose product containing not over 1 percent by weight of ash and enhanced in nutritional amino acids.

4. A process of producing an edible lactose product containing not over 1 percent by weight of ash on a solids basis and enhanced in nutritional amino acids and peptides which comprises:

digesting clarified and defatted whey, having a pH of about 5.5 in the presence of activated papain at a temperature in the range 50°–70° C. until the proteins are substantially entirely converted to a form non-precipitable by trichloroacetic acid, filtering the digest, demineralizing the filtrate by passing it in series through at least two demineralizing units, each unit comprising a bed of cation-exchange resin and a bed of anion-exchange resin, regulating the volume of solution treated with respect to the volume of the resin beds so that the effluent from the last unit contains less than 1 percent by weight of ash on a solids basis and has a pH in the approximate range 4.0–7.0, and concentrating the effluent by evaporation at a non-deleterious temperature below its normal boiling point.

FRANK H. TINKLER.
REXFORD C. STRIBLEY.
JOHN G. KENNEDY.

References Cited in the file of this patent

UNITED STATES PATENTS

| Number | Name | Date |
| --- | --- | --- |
| 1,041,896 | Stillwell | Oct. 22, 1912 |
| 1,085,380 | Downham | Jan. 27, 1914 |
| 2,465,906 | Meade et al. | Mar. 29, 1949 |
| 2,477,558 | Almy et al. | Aug. 2, 1949 |

OTHER REFERENCES

Associates of Lore A. Rogers, text "Fundamentals of Dairy Science," second edition 1935, pages 42, 48, 49, 64 to 68, 329.

Certificate of Correction

Patent No. 2,650,166            August 25, 1953

FRANK H. TINKLER ET AL.

It is hereby certified that error appears in the printed specification of the above numbered patent requiring correction as follows:

Column 3, line 45, for "spraying-drying" read *spray-drying*; column 5, line 49, for "remainded" read *remained*; line 74, for "H₂H-activated" read $H_2S$-*activated*; column 6, line 6, for "sparkingly" read *sparklingly*; line 38, for "throughout" read *throughput*;

and that the said Letters Patent should be read as corrected above, so that the same may conform to the record of the case in the Patent Office.

Signed and sealed this 20th day of October, A. D. 1953.

[SEAL]

ARTHUR W. CROCKER,
*Assistant Commissioner of Patents.* digesting clarified and defatted whey, having a pH of about 5.5 in the presence of activated papain at a temperature in the range 50°–70° C. until the proteins are substantially entirely converted to a form non-precipitable by trichloroacetic acid, filtering the digest, demineralizing the filtrate by passing it in series through at least two demineralizing units, each unit comprising a bed of cation-exchange resin and a bed of anion-exchange resin, regulating the volume of solution treated with respect to the volume of the resin beds so that the effluent from the last unit contains less than 1 percent by weight of ash on a solids basis and has a pH in the approximate range 4.0–7.0, and concentrating the effluent by evaporation at a non-deleterious temperature below its normal boiling point.

FRANK H. TINKLER.
    REXFORD C. STRIBLEY.
    JOHN G. KENNEDY.

References Cited in the file of this patent

UNITED STATES PATENTS

| Number | Name | Date |
| --- | --- | --- |
| 1,041,896 | Stillwell | Oct. 22, 1912 |
| 1,085,380 | Downham | Jan. 27, 1914 |
| 2,465,906 | Meade et al. | Mar. 29, 1949 |
| 2,477,558 | Almy et al. | Aug. 2, 1949 |

OTHER REFERENCES

Associates of Lore A. Rogers, text "Fundamentals of Dairy Science," second edition 1935, pages 42, 48, 49, 64 to 68, 329.

---

Certificate of Correction

Patent No. 2,650,166              August 25, 1953

FRANK H. TINKLER ET AL.

It is hereby certified that error appears in the printed specification of the above numbered patent requiring correction as follows:

Column 3, line 45, for "spraying-drying" read *spray-drying*; column 5, line 49, for "remainded" read *remained*; line 74, for "H₂H-activated" read *H$_2$S-activated*; column 6, line 6, for "sparkingly" read *sparklingly*; line 38, for "throughout" read *throughput*;

and that the said Letters Patent should be read as corrected above, so that the same may conform to the record of the case in the Patent Office.

Signed and sealed this 20th day of October, A. D. 1953.

[SEAL]

ARTHUR W. CROCKER,
              *Assistant Commissioner of Patents.*

Certificate of Correction

Patent No. 2,650,166 August 25, 1953

FRANK H. TINKLER ET AL.

It is hereby certified that error appears in the printed specification of the above numbered patent requiring correction as follows:

Column 3, line 45, for "spraying-drying" read *spray-drying*; column 5, line 49, for "remainded" read *remained*; line 74, for "H₂H-activated" read *H₂S-activated*; column 6, line 6, for "sparkingly" read *sparklingly*; line 38, for "throughout" read *throughput*;

and that the said Letters Patent should be read as corrected above, so that the same may conform to the record of the case in the Patent Office.

Signed and sealed this 20th day of October, A. D. 1953.

[SEAL]

ARTHUR W. CROCKER,
*Assistant Commissioner of Patents.*